United States Patent [19]

Dupin et al.

[11] Patent Number: 4,937,058

[45] Date of Patent: Jun. 26, 1990

[54] CATALYTIC OXIDATION OF SULFUR COMPOUNDS

[75] Inventors: Thierry Dupin, Garges Les Gonesse; Georges Dupuy, Fontenay Aux Roses, both of France

[73] Assignee: Rhone-Poulenc Industries, Paris, France

[21] Appl. No.: 311,400

[22] Filed: Feb. 15, 1989

Related U.S. Application Data

[63] Continuation of Ser. No. 188,621, Apr. 29, 1988, abandoned, which is a continuation of Ser. No. 538,841, Oct. 5, 1983, abandoned, which is a continuation of Ser. No. 254,652, Apr. 16, 1981, abandoned.

[30] Foreign Application Priority Data

Apr. 23, 1980 [FR] France ................................. 80 09127
Apr. 23, 1980 [FR] France ................................. 80 09128

[51] Int. Cl.$^5$ ..................... B01D 51/36; C01B 17/50; C01B 17/54
[52] U.S. Cl. .................................... 423/224; 423/244; 423/542; 423/543
[58] Field of Search ........... 423/224, 230, 231, 244 R, 423/539, 542, 543, 564

[56] References Cited

U.S. PATENT DOCUMENTS

| | | | |
|---|---|---|---|
| 1,900,751 | 3/1933 | Baehr | 423/539 X |
| 3,963,645 | 6/1976 | Gelbein | 252/456 X |
| 4,012,486 | 3/1977 | Singleton | 423/539 |
| 4,014,818 | 3/1977 | Tebben et al. | 252/459 X |
| 4,089,809 | 5/1978 | Farrior, Jr. | 252/459 |
| 4,123,507 | 10/1978 | Hass | 423/539 X |
| 4,184,983 | 1/1980 | Putz et al. | 423/210.5 |
| 4,233,276 | 11/1980 | D'Souza et al. | 423/539 |
| 4,277,458 | 7/1981 | Sugler et al. | 423/539 |

FOREIGN PATENT DOCUMENTS

769996 3/1957 United Kingdom ................ 423/539

*Primary Examiner*—Jeffrey E. Russel
*Attorney, Agent, or Firm*—Burns, Doane, Swecker & Mathis

[57] ABSTRACT

Sulfur containing organics, e.g., carbon disulfide, carbon oxysulfide, or a mercaptan, are oxidized to sulfur dioxide in gaseous phase, whether alone or conjointly with hydrogen sulfide and/or elemental sulfur, per se, by passing a gaseous stream thereof, at elevated temperature, over a catalyst composition which comprises (i) a carrier substrate comprising titanium oxide, silica, zirconium oxide, silica-magnesia, silica-zirconia, silica-titanium oxide, zirconia-titanium oxide, or a zeolite, or admixture thereof, and (ii) a catalytically effective amount of at least one catalytically active element of Group Ib, IIb, IIIb, Vb, VIb, VIIb, VIII or Va of the Periodic Table, e.g., copper, silver, zinc, cadmium, yttrium, a lanthanide, chromium, molybdenum, tungsten, manganese, iron, cobalt, rhodium, iridium, nickel, palladium, platinum, tin and/or bismuth, but said catalyst composition being devoid of mixed oxide of spinel type.

2 Claims, No Drawings

CATALYTIC OXIDATION OF SULFUR COMPOUNDS

This application is a continuation of application Ser. No. 188,621, filed Apr. 21, 1988 which is a continuation of application Ser. No. 538,841, filed Oct. 5, 1983, which is a continuation of application Ser. No. 254,652, filed Apr. 16, 1981, all now abandoned.

BACKGROUND OF THE INVENTION

1. Field of the Invention

The present invention relates to novel catalysts and to the utilization thereof for the oxidation of sulfur containing compounds, and, more especially, to such novel catalysts and the utilization thereof for the oxidation of carbon disulfide and/or carbon oxysulfide and/or mercaptans to sulfur dioxide, or for the simultaneous oxidation of hydrogen sulfide together with such sulfur containing organic compounds to $SO_2$.

2. Description of the Prior Art

It is known to this art that certain industrial effluents, and in particular those effluents emanating from Claus units, contain sulfur and/or oxidizable, polluting sulfur containing compounds, which species must be treated such as to be converted to sulfur dioxide by oxidation. The notable sulfur compound pollutants present in these effluents are mainly hydrogen sulfide and sulfur containing organic compounds, such as carbon disulfide and/or carbon oxysulfide and/or mercaptans. Indeed, hydrogen sulfide is a product of hydrolysis of such latter compounds.

It too is known to treat effluents containing hydrogen sulfide by burning or incinerating same at high temperatures, but this method is now obsolete, both because of the high energy consumption which it entails and, from a technical point of view, because of the amount of oxygen which it requires.

Furthermore, catalytic processes for treating gases containing hydrogen sulfide have already been proposed; however, these processes characteristically exhibit the disadvantages of insufficient catalytic activity, of not effecting complete oxidation of the hydrogen sulfide at a sufficiently low temperature, and of having an insufficiently long catalyst life.

It is also known, from published French Pat. Application No. 2,144,148, to oxidize those sulfur compounds contained in sulfur dioxide gas by catalytic transformation at 400°–600° C. in the presence of a catalyst containing an active phase comprising a mixed oxide of the spinel type of the general formula $M_{1x}Cr_zFe_{2-z}O_u$ in which M=Zn, Cu, Co, Ni, Mg, Mn or Cd. Such a catalyst, apart from its unsatisfactory performance, presents the considerable inconvenience of requiring for its preparation a calcination at a temperature of at least 650° C. for 4 hours in order to give rise to the spinel structure.

SUMMARY OF THE INVENTION

Accordingly, a major object of the present invention is the provision of an improved catalyst for the single step oxidation of sulfur containing organic compounds, and even sulfur itself, to sulfur dioxide.

Another object of this invention is the provision of an improved catalyst for the simultaneous or conjoint gas phase oxidation to sulfur dioxide of both hydrogen sulfide together with said sulfur containing organics. Said improved catalysts, moreover, are exceptionally long-lived, afford excellent yields of oxidation, and are prepared at temperatures of less than 550° C., while their active phase does not contain a mixed oxide of spinel type.

DETAILED DESCRIPTION OF THE INVENTION

More particularly according to this invention, the subject catalysts include, on the one hand, a support or carrier comprising titanium oxide or silica or zirconium oxide, or mixtures thereof, or silica-magnesia or zeolites, and, on the other hand, a catalytically effective amount of catalytically active elements selected from groups Ib, IIb, IIIb, Vb, VIb, VIIb, VIII and Va of the Periodic Table of elements. These catalysts make it possible, in particular, to effect the oxidation to sulfur dioxide of oxidizable sulfur containing compounds, such as carbon disulfide and/or carbon oxysulfide and/or mercaptans, and even sulfur itself, for that matter. Said catalysts too are especially useful for the simultaneous oxidation of hydrogen sulfide together with such oxidizable sulfur containing organic compounds, or with sulfur, per se.

Specifically, the present invention features a catalyst for the oxidation of sulfur containing compounds, including simultaneous oxidation of hydrogen sulfide and organic sulfur compounds, and even sulfur itself, to sulfur dioxide, such catalyst comprising, on the one hand, a carrier substrate of titanium oxide or silica or zirconium oxide, or mixtures thereof, or silica-magnesia or zeolites, and, on the other hand, a catalytically effective amount of at least one element selected from the group comprising copper, silver, zinc, cadmium, yttrium, the lanthanides, chromium, molybdenum, tungsten, manganese, iron, cobalt, rhodium, iridium, nickel, palladium, platinum, tin and bismuth, the catalyst being conspicuously devoid of a mixed oxide of the spinel type.

The present invention also relates to a process for the oxidation of organic sulfur compounds, and even sulfur itself, to sulfur dioxide, in gaseous phase, and also to the simultaneous such oxidation of hydrogen sulfide/sulfurated organics, characterized in that a gas containing at least one organic sulfur compound, or hydrogen sulfide/sulfur compound admixture, optionally including even sulfur itself, is passed over a catalyst comprising, on the one hand, a carrier substrate of titanium oxide or silica or zirconium oxide or silica-magnesia or silica-zirconia or silica-titanium oxide or zirconia-titanium oxide or a zeolite, and, on the other hand, a catalytically effective amount of at least one element selected from the group comprising copper, silver, zinc, cadmium, yttrium, the lanthanides, chromium, molybdenum, tungsten, manganese, iron, cobalt, rhodium, iridium, nickel, palladium, platinum, tin and bismuth, said catalyst not containing a mixed oxide of the spinel type.

Preferably, the catalysts according to the invention contain, as carrier or support, titanium oxide or silica or zirconium oxide or silica-magnesia or silica-zirconia or silica-titanium oxide or zirconia-titanium oxide or a zeolite, and, as the activating component therefor, a catalytically effective amount of at least one element selected from group A comprising copper, silver, molybdenum, tungsten, iron and bismuth, and at least one element selected from group B comprising the lanthanides, chromium, cobalt, rhodium, iridium, nickel, palladium, platinum and tin.

The catalysts according to the invention can be prepared in accordance with conventional processes and in particular by impregnating a support based on titanium oxide, or silica or zirconium oxide or silica-magnesia or silica-zirconia or silica-titanium oxide or zirconia-titanium oxide or zeolite with the catalytically active elements or suitable precursors thereof, or malaxating a powder of titanium oxide or silica or zirconium oxide, or mixtures thereof, or zeolites, with precursors of the catalytically active elements.

The subject catalysts can also be prepared by coating a refractory oxide with precursors of titanium oxide or silica or zirconium oxide, or mixtures thereof, on the one hand, and with the catalytically active elements or their precursors, on the other hand. As utilized herein, the term "precursor" is to be understood as connoting any compound which is adapted to provide the desired element or corresponding oxide thereof by heating.

Whatever their method of preparation, the catalysts of the invention are calcined in a final stage at a temperature lower than 550° C. in such manner that they do not contain a mixed oxide of spinel type; same are typically calcined at a temperature between about 300° C. and 550° C. and preferably between 350° C. and 450° C.

The catalysts comprising a support of titanium oxide or zirconium oxide or zirconia-titanium oxide, according to this invention, preferably have a specific surface area of between about 5 and 250 m$^2$/g and more preferably between 20 and 150 m$^2$/g.

And those catalysts comprising a support of silica, silica-magnesia, silica-zirconia or silica-titanium oxide, also according to the invention, preferably have a specific surface area of between about 50 and 600 m$^2$/g and more preferably between 80 and 500 m$^2$/g.

The zeolites which are useful consistent herewith are of the faujasite, mordenite or ferrierite type.

The atomic ratio of the catalytically active elements present in the catalyst to the titanium, silicon, zirconium, magnesia, or admixture thereof, advantageously ranges from about 0.00005 to 0.1.

In the case of the zeolites, the percentage by weight of the catalytically active elements present in the catalyst, relative to the zeolite carrier, ranges from about 0.05% to 10%.

Furthermore, according to a preferred embodiment of the invention, when precious metals are not used, the atomic ratio of all of the elements of group A to all the elements of group B present in the catalyst preferably ranges from 0.1 to 10 and more preferably from 0.5 to 5.

When precious metals of group VIII are employed as the catalytically active elements of group B, the atomic ratio noted hereinabove preferably ranges from 20 to 1,000 and more preferably from 50 to 400.

The process for the oxidation of organic sulfur compounds, or simultaneous oxidation of hydrogen sulfide/sulfurated organics, and optionally including sulfur itself, to sulfur dioxide in gaseous phase, and in the presence of the catalyst of the invention, is conveniently carried out by contacting a gas containing molecular oxygen with the effluent containing the said species to be oxidized. This gas is advantageously air, and, if appropriate, is oxygen-enriched air or pure oxygen. Such gas contains an amount of oxygen which is at least equal to, and preferably is greater than, that stoichiometric amount required to oxidize the total amount of said oxidizable species to sulfur dioxide. Advantageously, the amount of oxygen present in the oxidizing gas is a stoichiometric excess of about 15 to 100%.

The process of the invention is advantageously carried out at temperatures above about 150° C. and preferably at temperatures ranging from about 200 to 550° C.

The composition of the gases which can be treated in accordance with the process of this invention can vary over wide limits. Generally, the industrial effluents which can be treated according to the invention preferably contain approximately 0.5 to 5% by volume of the noted sulfur compounds.

The amounts of catalysts employed are preferably such that the VVH is between 1,000 and 30,000 and advantageously between 1,500 and 10,000 (VVH representing the volume of gas treated per volume of catalyst and per hour).

In order to further illustrate the present invention and the advantages thereof, the following specific examples are given, it being understood that same are intended only as illustrative and in nowise limitative.

EXAMPLE 1

A suspension of titanium oxide, obtained via hydrolysis and filtration following conventional process of attack or acidulation of ilmenite with sulfuric acid, was dried at 150° C. for 36 hours.

The resulting powder was malaxated, or intimately admixed, for 20 minutes in the presence of water and polyacrylamide.

The resulting mixture was extruded through a 3 mm die. The resulting extrudates were dried at 110° C. for 24 hours and then calcined at 430° C. for 2 hours.

Such product titanium oxide support was then impregnated with a solution of ferric nitrate and then calcined at 400° C. for 1 hour.

The final product catalyst had an atomic ratio $$\frac{Fe}{Ti}$$

of 0.06 and a specific surface area of 117 m$^2$g$^{-1}$, as measured by the BET (SBE) method.

EXAMPLE 2

The support obtained in accordance with Example 1 was impregnated with a solution of ferric nitrate and lanthnum nitrate. The catalyst was dried at 110° C. overnight and then calcined at 400° C. for 1 hour, and had the following characteristics:

Specific surface area: $SBE = 109$ m$^2$g$^{-1}$

Atomic ratio: $\frac{Fe + La}{Ti} = 0.09 \quad \frac{La}{Fe} = 2$

EXAMPLE 3

The catalyst of Example 1 was impregnated a second time, with a solution of palladium chloride. The final product was dried at 110° C. for 8 hours and then calcined at 350° C. for 1 hour. The catalyst possessed the following characteristics:

Specific surface area: $SBE = 104$ m$^2$g$^{-1}$

Atomic ratio: $\frac{Fe + Pd}{Ti} = 0.0603 \quad \frac{Fe}{Pd} = 200$

EXAMPLE 4

The catalyst of Example 1 was impregnated a second time, with a solution of chloroplatinic acid, dried at 110° C. for 24 hours and then calcined at 400° C. for 1 hour; the catalyst possessed the following characteristics:

Specific surface area: $SBE = 106 \text{ m}^2\text{g}^{-1}$

Atomic ratio: $\frac{Fe + Pt}{Ti} = 0.0606 \quad \frac{Fe}{Pt} = 100$

EXAMPLE 5

The support obtained in accordance with Example 1 was impregnated with a solution of silver nitrate. The final product was dried at 110° C. overnight and then calcined at 450° C. for 2 hours. The catalyst had the following characteristics:

Specific surface area: $SBE = 95 \text{ m}^2\text{g}^{-1}$

Atomic ratio: $\frac{Ag}{Ti} = 0.04$

EXAMPLE 6

The support obtained in accordance with Example 1 was impregnated with a solution of silver nitrate and cerous nitrate and it was subsequently dried at 150° C. for 4 hours and then calcined at 400° C. for 2 hours. The final product catalyst had the following characteristics:

Specific surface area: $SBE = 103 \text{ m}^2\text{g}^{-1}$

Atomic ratio: $\frac{Ag + Ce}{Ti} = 0.08 \quad \frac{Ag}{Ce} = 1$

EXAMPLE 7

In the preceding example, the cerous nitrate was replaced by cobalt nitrate. The catalyst then had the following characteristics:

Specific surface area: $SBE = 102 \text{ m}^2\text{g}^{-1}$

Atomic ratio: $\frac{Ag + Co}{Ti} = 0.07 \quad \frac{Ag}{Co} = 1.5$

EXAMPLE 8

The powder obtained after drying a suspension of titanium oxide, obtained by attack or acidulation of ilmenite with sulfuric acid, hydrolysis and filtration, was malaxated for 40 minutes in the presence of water, polyacrylamide and metatungstic acid. The resulting powder was extruded through a 3 mm die and the extrudates were dried at 110° C. for 24 hours and then calcined at 500° C. for 2 hours. The resulting catalyst then had the following characteristics:

Specific surface area: $SBE = 92 \text{ m}^2\text{g}^{-1}$

Atomic ratio: $\frac{W}{Ti} = 0.08$

EXAMPLE 9

The catalyst obtained as in Example 8 was subsequently impregnated with a solution of neodymium/-prasedymium acetate, dried at 150° C. for 4 hours and then calcined at 450° C. for 2 hours. The resulting catalyst had the following characteristics:

Specific surface area: $SBE = 91 \text{ m}^2\text{g}^{-1}$

Atomic ratio: $\frac{W + Nd + Pr}{Ti} = 0.10 \quad \frac{W}{Nd + Pr} = 4$

EXAMPLE 10

The catalyst obtained as in Example 8 was subsequently impregnated with a solution of nickel nitrate, dried at 150° C. for 4 hours and then calcined at 450° C. for 2 hours. The resulting catalyst had the following characteristics:

Specific surface area: $SBE = 89 \text{ m}^2\text{g}^{-1}$

Atomic ratio: $\frac{W + Ni}{Ti} = 0.12 \quad \frac{W}{Ni} = 2$

EXAMPLE 11

A silica support sold by the Societe Rhone-Poulenc was employed; such support had a specific surface area of $480 \text{ m}^2\text{g}^{-1}$.

This support was impregnated with a solution of ferrous sulfate slightly acidified with sulfuric acid. Same was dried at 150° C. for 2 hours and calcined at 450° C. for 2 hours The resulting catalyst had the following characteristics:

Specific surface area: $SBE = 410 \text{ m}^2\text{g}^{-1}$

Atomic ratio: $\frac{Fe}{Si} = 0.05$

EXAMPLE 12

The support of Example 11 was impregnated with a solution of ammoniacal cuprous chloride and was dried at 110° C. for 8 hours and then calcined at 450° C. for 2 hours. The resulting catalyst had the following characteristics:

Specific surface area: $SBE = 380 \text{ m}^2\text{g}^{-1}$

Atomic ratio: $\frac{Cu}{Si} = 0.04$

EXAMPLE 13

A silica-titanium oxide support containing 70% by weight of silica and 30% by weight of titanium oxide was employed; such support had a specific surface area of $350 \text{ m}^2/\text{g}$.

This support was impregnated with a solution of ammoniacal cuprous chloride, was dried at 150° C. and then impregnated again with a solution of ferric nitrate, and calcined at 400° C. for 2 hours. The resulting catalyst had the following characteristics:

Specific surface area: $SBE = \text{ m}^2\text{g}^{-1}$

Atomic ratio: $\frac{Cu + Fe}{Si + Ti} = 0.06 \quad \frac{Cu}{Fe} = 2$

EXAMPLE 14

The catalyst of Example No. 12 was impregnated with a solution of iridium chloride, dried at 110° C. for 24 hours and calcined at 400° C. for 2 hours. The resulting catalyst had the following characteristics:

Specific surface area: $SBE = 379 \ m^2g^{-1}$

Atomic ratio: $\frac{Cu + Ir}{Si} = 0.06015 \ \frac{Cu}{Ir} = 400$

EXAMPLE 15

The silica support used in Example 11 was impregnated with a solution of ammonium paramolybdate, dried at 110° C. overnight and then calcined at 450° C. for two hours. The resulting catalyst had the following characteristics:

Specific surface area: $SBE = 270 \ m^2g^{-1}$

Atomic ratio: $\frac{Mo}{Si} = 0.06$

EXAMPLE 16

A silica-magnesia support containing 60% by weight of silica and 40% by weight of magnesia was employed; such support specific surface area of 240 m²/g.

This support was impregnated with a solution of ammonium paramolybdate, dried it 150° C. for 4 hours and then calcined at 400° C. for 2 hours. The resulting catalyst had the following characteristics:

Specific surface area: $SBE = 215 \ m^2g^{-1}$

Atomic ratio: $\frac{Mo}{Si + Mg} = 0.05$

EXAMPLE 17

The silica support used in Example 11 was impregnated with a solution of bismuth nitrate in nitric acid, dried at 110° C. for 24 hours and then calcined at 450° C. for 2 hours. The resulting catalyst had the following characteristics:

Specific surface area: $SBE = 373 \ m^2g^{-1}$

Atomic ratio: $\frac{Bi}{Si} = 0.04$

EXAMPLE 18

The catalyst of Example 17 was impregnated with a solution of rhodium chloride, dried at 110° C. for 24 hours and then calcined at 400° C. for 2 hours. The resulting catalyst had the following characteristics:

Specific surface area: $SBE = 371 \ m^2g^{-1}$

Atomic ratio: $\frac{Bi + Rh}{Si} = 0.0401 \ \frac{Bi}{Rh} = 400$

EXAMPLE 19

A zirconium oxide support having a specific surface area of 82 $m^2g^{-1}$ was impregnated with a solution of ferric nitrate, dried at 150° C. for 8 hours and then calcined at 450° C. for 2 hours. The resulting catalyst had the following characteristics:

Specific surface area: $SBE = 76 \ m^2g^{-1}$

Atomic ratio: $\frac{Fe}{Zr} = 0.04$

EXAMPLE 20

The support used in the preceding example was impregnated with a solution of iron nitrate and lanthanum nitrate, dried at 110° C. for 24 hours and then calcined at 450 ° C. for 2 hours. The resulting catalyst had the following characteristics:

Specific surface area: $SBE = 72 \ m^2g^{-1}$

Atomic ratio: $\frac{Fe + La}{Zr} = 0.08 \ \frac{Fe}{La} = 1$

EXAMPLE 21

The catalyst obtained in Example 19 was impregnated with a solution of stannous chloride, dried it 150° C. for 4 hours and then calcined at 400° C. for 2 hours. The resulting catalyst had the following properties:

Specific surface area: $SBE = 68 \ m^2g^{-1}$

Atomic ratio: $\frac{Fe + Sn}{Zr} = 0.06 \ \frac{Fe}{Sn} = 2$

EXAMPLE 22

A NaX-type zeolite support having a specific surface area of 753 $m^2g^{-1}$ was exchanged using a solution of silver nitrate; the product was dried at 110° C. for 24 hours and then calcined at 450° C. for 2 hours. The resulting catalyst had the following characteristics:

$SBE = 722 \ m^2g^{-1}$ and contained 6% by silver.

EXAMPLE 23

The present example illustrates the actual use of the catalysts of the invention, obtained in accordance with each of the preceding examples.

A gas having the following composition by volume:
CS$_2$: 1,200 ppm
COS: 500 ppm
O$_2$: 2%
H$_2$O: 22%
N$_2$: 74.95% was charged into a reactor containing the respective catalysts.

The VVH was 1,800 and the gas inlet temperature was 350° C.

The results obtained utilizing each of the aforeprepared catalysts are reported in the following Table I:

TABLE I

| Catalyst of Example No. | Conversion of CS$_2$ in % | Conversion of COS in % |
|---|---|---|
| 1 | 85 | 56 |
| 2 | 92 | 73 |
| 3 | 99 | 92 |
| 4 | >99 | 95 |
| 5 | 83 | 65 |
| 6 | 92 | 85 |
| 7 | 89 | 87 |

TABLE I-continued

| Catalyst of Example No. | Conversion of CS$_2$ in % | Conversion of COS in % |
|---|---|---|
| 8 | 97 | 85 |
| 9 | 98 | 95 |
| 10 | 94 | 86 |
| 11 | 87 | 59 |
| 12 | 98 | 73 |
| 13 | >99 | 98 |
| 14 | 87 | 74 |
| 15 | 92 | 79 |
| 16 | 76 | 54 |
| 17 | 98 | 79 |
| 18 | 89 | 74 |
| 19 | 94 | 88 |
| 20 | 94 | 89 |
| 21 | 88 | 65 |
| 22 | 98 | 79 |

EXAMPLE 24

This example also illustrates the actual use of the catalysts of the invention, obtained in accordance with each of the preceding Examples 1 to 22, inclusive.

A gas having the following composition by volume:
H$_2$S: 800 ppm
COS: 100 ppm
CS$_2$: 500 ppm
SO$_2$: 400 ppm
O$_2$: 2%
H$_2$O: 30%
N$_2$: 67.82% was charged into a reactor containing the respective catalysts.

The VVH was 1,800 and the gas inlet temperature was 380° C.

The results obtained utilizing each of the catalysts prepared in the Examples 1–22, respective, are reported in the following Table II:

TABLE II

| Catalyst of Example No. | Conversion of H$_2$S in % | Conversion of CS$_2$ in % | Conversion of COS in % |
|---|---|---|---|
| 1 | GREATER | 63 | 45 |
| 2 | THAN | 84 | 63 |
| 3 | 99% | 95 | 86 |
| 4 | IN | 98 | 89 |
| 5 | EACH | 55 | 66 |
| 6 | EXAMPLE | 79 | 69 |
| 7 |  | 73 | 75 |
| 8 |  | 83 | 73 |
| 9 |  | 92 | 84 |
| 10 |  | 88 | 77 |
| 11 |  | 82 | 63 |
| 12 |  | 64 | 47 |
| 13 |  | 88 | 65 |
| 14 |  | 94 | 92 |
| 15 |  | 75 | 64 |
| 16 |  | 83 | 69 |
| 17 |  | 61 | 36 |
| 18 |  | 91 | 65 |
| 19 |  | 71 | 54 |
| 20 |  | 89 | 67 |
| 21 |  | 86 | 73 |
| 22 |  | 93 | 66 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the oxidation of sulfur containing organic compounds and/or elemental sulfur, per se, to sulfur dioxide substantially in the absence of sulfur trioxide in a single step, comprising passing a gaseous stream containing such compounds and/or elemental sulfur and molecular oxygen in an amount from at least the stoichiometric amount required to oxidize the total oxidizable compounds to sulfur dioxide to a stoichiometric excess of 100%, at elevated temperatures, over a catalyst composition which consists essentially of (i) a carrier substrate selected from the group consisting of titanium oxide, silica, zirconium oxide, silica-magnesia, silica-zirconia, silica-titanium oxide, zirconia-titanium oxide, or a zeolite, or admixture thereof, and (ii) a catalytically effective amount of at least one catalytically active element, said catalytically active element including at least one element selected from the group consisting of copper, silver, molybdenum, and tungsten, in combination with the element tin, said catalyst composition being devoid of mixed oxide of the spinel type.

2. A process for the simultaneous oxidation of hydrogen sulfide and a sulfur containing organic compound, and/or elemental sulfur, per se, to sulfur dioxide substantially in the absence of sulfur trioxide in a single step, comprising passing a gaseous stream containing such compounds and/or elemental sulfur and molecular oxygen in an amount from at least the stoichiometric amount required to oxidize the total oxidizable compounds to sulfur dioxide to a stoichiometric excess of 100%, at elevated temperatures, over a catalyst composition which consists essentially of (i) a carrier substrate selected from the group consisting of titanium oxide, silica, zirconium oxide, silica-magnesia, silica-zirconia, silica-titanium oxide, zirconia-titanium oxide, a zeolite, or admixture thereof, and (ii) a catalytically effective amount of at least one catalytically active element, said catalytically active element (ii) including at least one element selected from the group consisting of copper, silver, molybdenum, and tungsten, in combination with the element tin, said catalyst composition being devoid of mixed oxide of the spinel type.

* * * * *